United States Patent
Klatte

(10) Patent No.: US 6,174,508 B1
(45) Date of Patent: Jan. 16, 2001

(54) METHOD OF PRODUCING CHLORINE DIOXIDE USING SODIUM CHLORITE AND A WATER-RETAINING SUBSTANCE IMPREGNATED IN ZEOLITE OR IN AQUEOUS SOLUTION

(76) Inventor: Fred Klatte, Two Spruce St., San Francisco, CA (US) 94118

( * ) Notice: Under 35 U.S.C. 154(b), the term of this patent shall be extended for 0 days.

(21) Appl. No.: 09/274,455

(22) Filed: Mar. 22, 1999

Related U.S. Application Data

(63) Continuation-in-part of application No. 08/798,873, filed on Feb. 11, 1997, now Pat. No. 5,885,543.

(51) Int. Cl.$^7$ ................................................ B01J 8/00
(52) U.S. Cl. .................. 423/245.1; 423/477; 502/60; 502/64; 502/67; 210/754; 422/4; 422/29; 422/30; 422/37
(58) Field of Search .................. 423/245.1, 477; 502/60, 64, 67; 210/754; 422/4, 29, 30, 37

(56) References Cited

U.S. PATENT DOCUMENTS

| | | | |
|---|---|---|---|
| 2,482,891 | 9/1949 | Aston | 252/187 |
| 3,271,242 | 9/1966 | McNicholas | 167/17 |
| 4,247,531 | 1/1981 | Hicks | 423/477 |
| 4,547,381 | 10/1985 | Mason et al. | 426/316 |
| 4,585,482 | 4/1986 | Tice et al. | 106/15.05 |
| 4,590,057 | 5/1986 | Hicks | 423/477 |
| 4,689,169 | 8/1987 | Mason et al. | 252/186.24 |
| 4,731,193 | 3/1988 | Mason et al. | 252/95 |
| 4,889,654 | 12/1989 | Mason et al. | 252/100 |
| 5,278,112 | 1/1994 | Klatte | 502/62 |
| 5,360,609 | 11/1994 | Wellinghoff | 514/772.3 |
| 5,567,405 | 10/1996 | Klatte et al. | 423/477 |
| 5,573,743 | 11/1996 | Klatte et al. | 423/477 |
| 5,631,300 | 5/1997 | Wellinghoff | 514/772.3 |
| 5,639,295 | 6/1997 | Wellinghoff et al. | 106/15.05 |
| 5,668,185 | 9/1997 | Wellinghoff | 514/772.3 |
| 5,705,092 | 1/1998 | Wellinghoff et al. | 252/187.21 |
| 5,730,948 | * 3/1998 | Klatte et al. | 423/477 |
| 5,885,543 | * 3/1999 | Klatte | 423/477 |
| 6,077,495 | 2/2000 | Speronello et al. | |

FOREIGN PATENT DOCUMENTS

WO 98/38865   9/1998   (WO) ............................. A01N/59/00

OTHER PUBLICATIONS

Masschelein, *Chlorine Dioxide—Chemistry and Environmental Impact of Oxychlorine Compounds* (1979) (Ann Arbor Science Publishers Inc., Ann Arbor, Michigan), pp. 138–141.

Morita, Yasuo, et al., "Manufacture of a Solid Chlorine Dioxide Generating Agent," *Chemical Abstracts*, vol. 100, No. 2, Abstract No. 9463, Jan. 9, 1984.

JP 6–285368 by Tookemi Kk (Oct. 1994).

JP 58–161904 (Abstract) Sep. 1983.

\* cited by examiner

*Primary Examiner*—Tom Dunn
(74) *Attorney, Agent, or Firm*—Alston & Bird LLP

(57) ABSTRACT

A method for producing chlorine dioxide by activating zeolite crystals (which have been impregnated with metal chlorite such as sodium chlorite, and optionally also a water-retaining substance such as magnesium sulfate, potassium chloride, potassium hydroxide, or calcium chloride) with excess protons, or activating an aqueous solution of metal chlorite and such a water-retaining substance with excess protons. Proton generating species useful for the activation are acids such as acetic, phosphoric, and citric acid, and metal salts such as ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$. The activation can be performed by causing fluid to flow through a bed of zeolite crystals impregnated with calcium chloride (or other water-retaining substance) and sodium chlorite, and a bed of zeolite crystals impregnated with a proton generating species. The activation can also be performed by immersing impregnated zeolite crystals in (or spraying them with) acid or another proton generating species. To produce chlorine dioxide using a sodium chlorite-containing aqueous solution, the solution can be mixed or otherwise combined with acid.

34 Claims, 2 Drawing Sheets

METHOD OF PRODUCING CHLORINE DIOXIDE USING SODIUM CHLORITE AND A WATER-RETAINING SUBSTANCE IMPREGNATED IN ZEOLITE OR IN AQUEOUS SOLUTION

CROSS-REFERENCE TO RELATED-APPLICATION(S)

This is a continuation-in-part application of U.S. application Ser. No. 08/798,873, filed Feb. 11, 1997, now U.S. Pat. No. 5,885,543 and entitled "Method for Producing Chlorine Dioxide Using Calcium Chloride Impregnated Zeolite or Aqueous Calcium Chloride", inventor Fred Klatte.

FIELD OF THE INVENTION

The invention relates to methods for producing chlorine dioxide, and to substances used in performing such methods. Each method produces chlorine dioxide by activating zeolite crystals (previously impregnated with a mixture of sodium chlorite and a water-retaining substance such as calcium chloride) with protons (from an acid or other proton generating species), or by activating an aqueous solution of a water-retaining substance (such as calcium chloride) and sodium chlorite with protons (from an acid or other proton generating species).

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to one quarter inch) have been employed in air (or other gas) and water filtration systems to selectively absorb contaminants from a flowing stream of water or gas.

U.S. Pat. No. 5,567,405, issued Oct. 22, 1996 (based on U.S. application Ser. No. 08/445,025, filed May 19, 1995), and U.S. Pat. No. 5,573,743, issued Nov. 12, 1996 (based on U.S. application Ser. No. 08/445,076), teach methods for producing zeolite crystals impregnated with one or more of sodium chlorite, acetic acid, phosphoric acid, and citric acid, and methods for producing chlorine dioxide by moving a fluid (e.g., air or water) relative to a bed of zeolite crystals impregnated with sodium chlorite, and moving the fluid relative to another bed of zeolite crystals impregnated with one of the following: phosphoric acid, acetic acid and citric acid. The two beds can be physically mixed together, or the fluid can flow sequentially through distinct first and second beds. These references also teach a method for filtering a fluid by producing chlorine dioxide in the fluid (in the manner described in this paragraph) and then absorbing the chlorine dioxide from the fluid.

U.S. patent application Ser. No. 08/704,086, filed Aug. 28, 1996, now U.S. Pat. No. 5,730,948 teaches a variation on the chlorine dioxide production method of U.S. Pat. No. 5,567,405, which includes the steps of moving a fluid through a first bed of impregnated zeolite crystals (impregnated with at least one of phosphoric acid, acetic acid, and citric acid) and then moving the fluid through a second bed of impregnated zeolite crystals (impregnated with sodium chlorite).

Chlorine dioxide ($ClO_2$) is useful for killing biological contaminants (such as microorganisms, mold, fungi, yeast and bacteria) and for oxidizing volatile organic chemicals which can contaminate fluid.

It is known to produce chlorine dioxide by: activating a metal chlorite solution by adding an acid thereto, activating a powdered composition (or other dry composition) by adding water thereto, or preparing an activated dry composition which releases chlorine dioxide over time. U.S. Pat. No. 4,547,381 (issued Oct. 15, 1985) and U.S. Pat. No. 4,689,169 (issued Aug. 25, 1987) mention these three techniques for producing chlorine dioxide, and disclose in some detail one type of such an activated dry composition. They teach that this activated dry composition is a mixture of a "dry inert diluent," a metal chlorite, and a dry agent capable of reacting with the metal chlorite in a dry state to produce chlorine dioxide. The metal chlorite can be sodium chlorite, and the dry agent can be a "dry acid" such as granular citric acid. The inert diluent can be diatomaceous earth, sodium chloride, sodium silicate, disodium sulfate, or magnesium chloride, or a combination of two or more thereof. The mixture releases chlorine dioxide over time until the rate of chlorine dioxide release becomes low, and the patents teach that the mixture can then be agitated for "renewed generation" of chlorine dioxide.

However, an activated composition (such as that described in U.S. Pat. Nos. 4,547,381 and 4,689,169) is subject to undesirable storage and shipping losses, due to outgassing of chlorine dioxide before the time of intended use of the composition.

Similarly, the inventor has found that sodium chlorite-impregnated zeolite crystals (of the type described in referenced U.S. Pat. Nos. 5,567,405 and 5,573,743) are also subject to undesirable storage and shipping losses, due to outgassing of chlorine dioxide therefrom before the time of their intended use (e.g., before fluid is caused to flow through both a bed of the sodium chlorite-impregnated zeolite crystals and a bed of acid-impregnated zeolite crystals). Also, efforts to activate sodium chlorite-impregnated zeolite crystals (of the type described in referenced U.S. Pat. Nos. 5,567,405 and 5,573,743) with acid at low temperature (below 40 degrees Fahrenheit) may fail in the sense that they will not result in release of sufficient amounts of chlorine dioxide.

There are also disadvantages to use of conventional metal chlorite solutions (of the type mentioned in U.S. Pat. Nos. 4,547,381 and 4,689,169) to produce chlorine dioxide. For example, when such a conventional solution is activated (by adding an acid thereto) to release chlorine dioxide gas, it is difficult or impossible to control the rate of release of the chlorine dioxide gas. Overproduction of chlorine dioxide often results.

There are also disadvantages to use of conventional powdered or dry compositions of the type activated by adding water thereto to release chlorine dioxide (as mentioned, for example, in U.S. Pat. Nos. 4,547,381 and 4,689,169). Masschelein, in the book *Chlorine Dioxide—Chemistry and Environmental Impact of Oxychlorine Compounds* (published 1979 by Ann Arbor Science Publishers Inc., Ann Arbor, Mich.) at page 140, describes one such dry mixture comprising sodium chlorite, and a solid organic anhydride containing 2 to 20% of a desiccating product such as calcium chloride. When such a conventional dry composition is activated (by adding water thereto) to release chlorine dioxide gas, it is typically difficult or impossible to control the rate of release of the chlorine dioxide to achieve chlorine dioxide release rates useful for such applications as air or water filtration. Overproduction of chlorine dioxide often results.

Until the present invention, it was not known how to produce a stable, unactivated substance (either in liquid or dry form) which does not release significant amounts of chlorine dioxide until activated by exposure to an acid, and which releases chlorine dioxide at a useful (and controllable) rate when exposed to an acid (even at temperatures below 40 degrees Fahrenheit). Nor had it been known to use such a stable, unactivated substance to produce controlled release of chlorine dioxide for filtering air or water.

SUMMARY OF THE INVENTION

In some embodiments, the invention is a method for producing chlorine dioxide by activating zeolite crystals (previously impregnated with sodium chlorite and calcium chloride) with excess protons or activating an aqueous solution of sodium chlorite and calcium chloride with excess protons. Typically, the excess protons are produced by exposing the crystals to an acid (or other proton generating species), or exposing the aqueous solution of sodium chlorite and calcium chloride to an acid (or other proton generating species). Examples of proton generating species useful for such activation are acids such as acetic acid, phosphoric acid, citric acid, HCl, propionic acid, and sulfuric acid, and metal salts such as ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$. In some embodiments the proton generating species releases excess protons upon exposure to the impregnated zeolite crystals themselves. In other embodiments the proton generating species must itself be activated to cause it release excess protons, so that the protons can in turn activate the impregnated zeolite crystals.

In accordance with the invention, the step of activating zeolite crystals with excess protons can be performed by causing a fluid (e.g., air, another oxygen-containing fluid, or water) to flow through a bed of zeolite crystals impregnated with sodium chlorite and calcium chloride, and a bed of zeolite crystals impregnated with the proton generating species. The two beds can be physically mixed together, or the fluid can be caused to flow sequentially through distinct first and second beds (preferably first through the bed containing proton generating species-impregnated zeolite, but alternatively first through the bed containing sodium chlorite and calcium chloride-impregnated zeolite). Alternatively, chlorine dioxide is produced using sodium chlorite and calcium chloride-impregnated zeolite crystals by immersing the impregnated zeolite in (or spraying the impregnated zeolite with) acid or another proton generating species, or otherwise exposing the impregnated zeolite to acid (preferably aqueous acetic, phosphoric, citric acid, HCl, sulfuric acid, propionic acid, or another acid, with a concentration of 0.025% to 0.5%, in the sense that the acid comprises 0.025% to 0.5% by weight of the combined impregnated zeolite and acid) or another proton generating species.

To produce chlorine dioxide using the inventive aqueous solution of sodium chlorite and calcium chloride, the solution can be mixed (or otherwise combined) with acid. The liquid mixture can then be sprayed or coated on a surface (or the liquid mixture can be absorbed in a material such as a sponge, pad, mat, or the like, or simply placed in a reservoir, container, box, or the like) from which chlorine dioxide gas can escape at a desired rate.

In any of the embodiments, the rate of chlorine dioxide release (following activation) can be controlled in any of several ways, including by appropriately selecting the concentration and amount of the activating acid (or other proton generating species), and using impregnated zeolite having appropriately selected weight ratios of metal chlorite (e.g., sodium chlorite) or sodium chlorate to zeolite, and deliquescent or water absorbing and retaining substance (e.g., calcium chloride) to zeolite.

Other embodiments of the invention are substances useful for producing chlorine dioxide, which are stable until activated with excess protons (in the sense that they do not release chlorine dioxide gas in significant amounts until so activated with protons). One such embodiment is one or more zeolite crystals impregnated with sodium chlorite and calcium chloride. Preferably, the zeolite crystals are small (each of size in a range from 0.2 mm to one quarter inch). Also preferably, the crystals comprise 1%–6% sodium chlorite, 0.5%–2% calcium chloride, 0%–20% (4%–8% in some preferred embodiments) water, and 72%–98.5% (8%–94.5% in some preferred embodiments) zeolite by weight. Another such embodiment is an aqueous solution of sodium chlorite and at least one chemical selected from the group consisting of magnesium sulfate, potassium chloride, potassium hydroxide, and calcium chloride, preferably comprising 1%–6% of sodium chlorite, 0.5%–2% of said at least one chemical, and 92%–98.5% of water (by weight). Preferably, the solution comprises 1%–6% sodium chlorite, 0.5%–2% calcium chloride, and 92%–98.5% water (by weight).

In variations on any embodiment of the invention, a water-retaining substance other than calcium chloride, such as magnesium sulfate ($MgSO_4$), potassium chloride, or potassium hydroxide, is substituted for calcium chloride. For example, zeolite crystals impregnated with sodium chlorite and magnesium sulfate are within the scope of the invention. For another example, a method of producing chlorine dioxide by activating an aqueous solution of sodium chlorite and magnesium sulfate with an acid is also within the scope of the invention.

In other variations on any embodiment of the invention, a metal chlorite other than sodium chlorite is substituted for sodium chlorite. For example, zeolite crystals impregnated with calcium chloride (or magnesium sulfate) and a metal chlorite other than sodium chlorite are within the scope of the invention.

The inventor has found that the presence (in a sufficient amount) of calcium chloride (or another water-retaining substance such as magnesium sulfate, potassium chloride, or potassium hydroxide) in the unactivated composition of the invention reduces the rate of chlorine dioxide outgassing to no more than a negligible amount at times prior to activation of the composition with protons, and yet allows release of chlorine dioxide at a desired rate following activation of the composition with protons. One of the reasons for chlorine dioxide outgassing (prior to activation with excess protons) from zeolite impregnated with metal chlorite (but not impregnated with a water-retaining substance such as calcium chloride) is migration of protons in the aluminosilicates comprising the zeolite.

In other embodiments, the invention is a method for producing chlorine dioxide, including the steps of providing a zeolite crystal mixture, wherein the mixture comprises zeolite crystals impregnated with sodium chlorate and zeolite crystals impregnated with an oxidizer, and activating the mixture with excess protons, and a zeolite crystal mixture for use in performing such method. In other embodiments, the invention is a method for producing chlorine dioxide, including the steps of providing a zeolite crystal mixture, wherein the mixture comprises zeolite crystals impregnated with a proton generating species and zeolite crystals impregnated with an oxidizer (or sodium chlorate), and causing the zeolite crystal mixture to come in contact with sodium chlorate solution (or an oxidizer, where the mixture includes zeolite crystals impregnated with sodium chlorate but not an oxidizer), and a zeolite crystal mixture for use in performing such method.

DETAILED DESCRIPTION OF THE PREFERRED EMBODIMENTS

Figure 1:
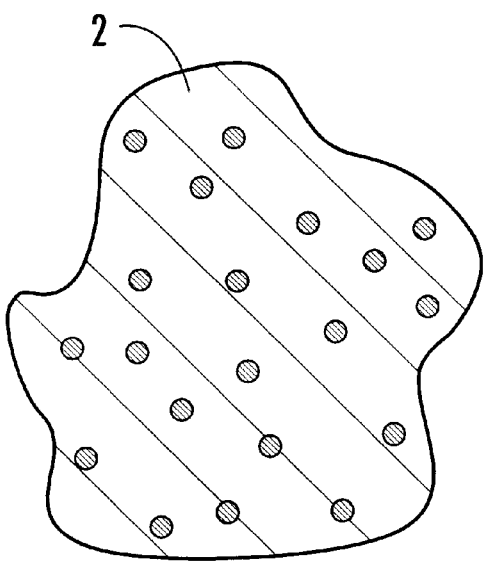
FIG. 1 is a cross-sectional view of a zeolite crystal impregnated with a metal chlorite, and one of calcium chloride (or other deliquescent or water absorbing and retaining substance), magnesium sulfate, potassium chloride, and potassium hydroxide.

In one class of embodiments, the invention is a process for impregnating zeolite crystals with sodium chlorite and calcium chloride, and the product of such process. The zeolite crystals can have size (i.e., largest dimension) equal (or approximately equal) to 0.125 inch, 0.25 inch, 0.50 inch, or 0.75 inch, or size in the range from 0.2 mm to several millimeters, or size in the range from 0.2 mm to 0.25 inch, or the zeolite crystals can have dimensions equal or substantially equal to 0.25 inch×0.167 inch, 0.125 inch×0.10 inch, 0.25 inch×0.125 inch, 0.125 inch×0.50 inch, or 0.50 inch×0.75 inch. The impregnation process produces zeolite crystals uniformly impregnated (throughout the volume of each crystal) with sodium chlorite and calcium chloride.

Preferred embodiments of this impregnation process employ, as input material, zeolite crystals whose moisture content has been reduced (substantially below an initial moisture content) to a low level (preferably about 5%). Such input material is preferably produced by mining zeolite, crushing the mined mineral into appropriately sized zeolite crystals (having a natural moisture content substantially above 5%), and then dehydrating the zeolite crystals until their moisture content is reduced to about 5%.

The dehydrated zeolite crystals are then immersed in (or sprayed with) an aqueous solution of sodium chlorite and calcium chloride at high temperature (e.g., in the range from 120° F. to 190° F.), and the resulting slurry is thoroughly mixed. Then, the mixed slurry is air dried (or allowed to equilibrate) to the desired moisture level (typically 0–20%) to produce impregnated zeolite crystals. Alternatively, the air drying step can be avoided by calculating the amount of aqueous impregnating material needed to achieve the desired final moisture level (e.g., 15%) and adding this amount to the dehydrated zeolite at the time of impregnation.

Alternatively, the dehydrated zeolite crystals are immersed in (or sprayed with) an aqueous solution of sodium chlorite at high temperature (e.g., at least 190° F.), and the resulting slurry is thoroughly mixed. Then, the mixed slurry is air dried (or allowed to equilibrate) to the desired moisture level to produce sodium chlorite-impregnated zeolite crystals. Alternatively, one calculates the amount of aqueous sodium chlorite needed to achieve the desired moisture level (e.g., a desired level in the range 15%–20%) and adds this amount to the dehydrated zeolite at the time of impregnation. Then, the sodium chlorite-impregnated zeolite crystals are immersed in (or sprayed with) an aqueous solution of calcium chloride at high temperature, and the resulting slurry is thoroughly mixed. Then, the mixed slurry is air dried (or allowed to equilibrate) to the desired final moisture level (typically 0–20%) to produce zeolite crystals impregnated with both sodium chlorite and calcium chloride. Alternatively, air drying is avoided by calculating the amount of aqueous calcium chloride needed to achieve the desired final moisture level (e.g., a desired level in the range 15%–20%) and adding this amount to the sodium chlorite-impregnated zeolite at the time of calcium chloride impregnation.

In variations of any of the described zeolite impregnation processes, a water-retaining substance such as magnesium sulfate ($MgSO_4$), potassium chloride, or potassium hydroxide is substituted for calcium chloride as an impregnating agent.

In other variations on the described zeolite impregnation processes, a metal chlorite other than sodium chlorite is substituted for sodium chlorite.

FIG. 1 represents one impregnated zeolite crystal, having channels uniformly impregnated with mixture 2 of metal chlorite and a water-retaining substance. The water-retaining substance is preferably calcium chloride, but alternatively is magnesium sulfate, potassium chloride, potassium hydroxide, or another water-retaining substance. The metal chlorite is preferably sodium chlorite.

The rate at which impregnated zeolite crystals of the type shown in FIG. 1 (e.g., zeolite crystals uniformly impregnated sodium chlorite and calcium chloride) react with in the presence of excess protons to release chlorine dioxide can be controlled (reduced or increased to a desired level) by varying the relative amounts (by weight) of the different impregnating agents therein.

In some embodiments of the invention, the proton generating species is in the form of zeolite crystals impregnated with one or more metal salts (preferably one or more of ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$). Upon exposure of the metal salt or salts to water (either liquid water or a moisture-containing gas, e.g. atmospheric moisture), excess protons are generated.

In other embodiments of the invention, the proton generating species is activated (other than by exposure to water) to release excess protons. The proton generating species is activated in such a manner that impregnated zeolite crystals are exposed to excess protons, thereby initiating a reaction resulting in release of chlorine dioxide gas. In some embodiments, the proton generating species releases excess protons upon exposure to the impregnated zeolite crystals themselves (the impregnated zeolite crystals together with the proton generating species does not need to be further activated to cause the proton generating species to release excess protons).

Figure 2:
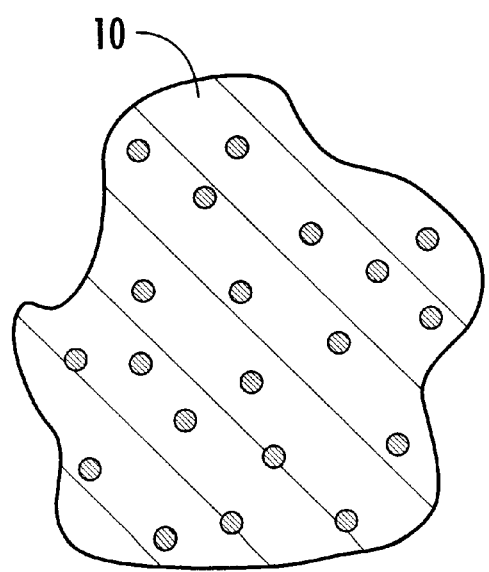
FIG. 2 is a cross-sectional view of a zeolite crystal impregnated with a proton generating species, or another substance or mixture of substances in accordance with any of the embodiments of the invention.

In some embodiments of the invention, the proton generating species is in the form of zeolite crystals impregnated with at lease one acid (preferably one or more of acetic acid, citric acid, phosphoric acid, HCl, propionic acid, and sulfuric acid). Above-referenced U.S. Pat. Nos. 5,567,405 and 5,573,743 disclose methods for producing such acid-impregnated zeolite crystals. Briefly, the acid impregnation step is preferably performed by immersing dehydrated zeolite crystals in (or spraying zeolite crystals with) an aqueous solution of one or more of the acids at high temperature, thoroughly mixing the resulting slurry, and finally air drying (or allowing the slurry to equilibrate) to the desired moisture level (e.g. 0%–20%) the mixed slurry to produce the acid-impregnated zeolite crystals. FIG. 2 represents one such impregnated crystal, having channels uniformly impregnated (throughout the volume of the crystal) with chemical 10, where chemical 10 is acetic acid, citric acid, phosphoric acid, HCl, propionic acid, or sulfuric acid (or another acid), or a mixture of two or more of such acids, or another proton generating species, or another substance or mixture of substances in accordance with any of the embodiments of the invention.

In general, the acid or acids employed (for activation of impregnated zeolite crystals) in accordance with the invention can be impregnated in zeolite crystals, mixed in an aqueous solution (including a metal chlorite and a water-retaining substance such as calcium chloride), or added to (e.g., sprayed on) zeolite crystals that have been impregnated with a metal chlorite and a water-retaining substance such as calcium chloride.

With reference again to zeolite crystals that have been impregnated in accordance with the invention with sodium chlorite and calcium chloride, such crystals are preferably small (each of size in a range from 0.2 mm to one quarter inch), and each crystal preferably comprises 1%–6% sodium chlorite, 0.5%–2% calcium chloride, 0%–20% (4%–8% in some preferred embodiments) water, and 72%–98.5% (84%–94.5% in some preferred embodiments) zeolite by weight. The inventor has found that the presence of calcium chloride (preferably in the preferred amount noted above) in the unactivated impregnated zeolite reduces the rate of chlorine dioxide outgassing to no more than a negligible amount until activation of the composition with acid, and yet allows release of chlorine dioxide at a desired rate following activation of the composition with acid. This finding was unexpected, since mixing of sodium chlorite and calcium chloride with water would have been expected to produce chlorine dioxide as a result of the following sequence of reactions:

1. $2NaClO_2+2H_2O+CaCl_2\rightarrow$
2. $Ca(OH)_2+2HCL+2NaClO_2\rightarrow$
3. $HCL+NaClO_2+NaCl+ClO_2\uparrow+protons$.

Instead, the unexpected finding that the rate of chlorine dioxide outgassing is substantially reduced is believed to result from the following reaction:

1. $2NaClO_2+H_2O+CaCl_2\rightarrow$
2. $H_2O+CaClO_2+2NaCl$.

The products of this reaction, when activated with excess protons (e.g., by exposure to acid or a metal salt) are converted to $ClO_2\uparrow$ and other substances including excess protons. In another embodiment, when sodium chlorite and ferric chloride react with water to produce chlorine dioxide gas, it is believed that the chlorine dioxide is produced as a result of the following reaction: $3NaClO_2+3H_2O+FeCl_3\rightarrow 3ClO_2+(Fe)(OH)_3+3NaCl$.

In another class of embodiments, the invention is an aqueous solution of sodium chlorite and calcium chloride (or sodium chlorite and a water-retaining substance other than calcium chloride). This solution can be activated by exposure to protons (e.g., as a result of exposure to a proton generating species such as acetic acid, phosphoric acid, citric acid, or another acid) so as to release chlorine dioxide in a controlled manner. Preferably, the solution comprises 1%–6% sodium chlorite, 0.5%–2% calcium chloride, and 92%–98.5% water (by weight). Also preferably, the solution is activated by being mixed (or otherwise combined) with aqueous acetic acid, phosphoric acid, citric acid, HCl, propionic acid, or sulfuric acid (or another acid) having a concentration of 0.025% to 0.5% (by weight of the total mixture). An example of such an aqueous acid is produced by adding 1% (by weight of the total mixture) of a 3% aqueous acetic acid solution. The activated liquid mixture (of aqueous sodium chlorite, calcium chloride, and acid) can then be sprayed or coated on a surface (or the liquid mixture can be absorbed in a material such as a sponge, pad, mat, or the like, or simply placed in a reservoir) from which chlorine dioxide gas can escape at a desired rate.

The inventor has found that the presence of diluted calcium chloride or one of the alternative water-retaining substances (preferably in the above-noted preferred amount of 0.5%–2% by weight) in the unactivated solution reduces the rate of chlorine dioxide outgassing to no more than a negligible amount at times prior to activation with an acid, and yet allows release of chlorine dioxide at a desired rate upon activation of the solution with acid. The unexpected finding that the rate of chlorine dioxide outgassing (prior to activation) is substantially reduced is believed to result from the following reaction in the unactivated solution:

1. $2NaClO_2+H_2O+CaCl_2\rightarrow$
2. $H_2O+CaClO_2+2NaCl$.

The products of this reaction, when activated with excess protons (e.g., by addition of acid) are converted to $ClO_2\uparrow$ and other substances including excess protons.

The impregnated zeolite crystals of the invention (crystals impregnated with a metal chlorite and calcium chloride, or a metal chlorite and a water-retaining substance other than calcium chloride) are useful in a class of methods for producing chlorine dioxide ($ClO_2$). Such methods will be described in preferred embodiments in which calcium chloride is an impregnating agent and the metal chlorite is sodium chlorite, but it should be understood that a water-retaining substance (such as magnesium sulfate, potassium chloride, or potassium hydroxide) can be substituted for calcium chloride as an impregnating agent in the methods (and that a metal chlorite other than sodium chlorite can be substituted for sodium chlorite).

In one chlorine dioxide-producing method in accordance with the invention, a fluid (preferably a fluid containing oxygen, such as air or water) is caused to move relative to a first bed (i.e., the fluid flows through the first bed or the crystals comprising the first bed move through the fluid) of zeolite crystals impregnated with: (1) phosphoric acid ($H_3PO_4$), (2) acetic acid ($CH_3COOH$), (3) citric acid, (4) ferric chloride ($FeCl_3$), (5) ferric sulfate, or (6) another metal salt, such as $ZnSO_4$, $ZnCl_2$, $CoSO_4$, $CoCl_2$, $MnSO_4$, $MnCl_2$, $CuSO_4$, $CuCl_2$, or $MgSO_4$, or (7) an acid other than phosphoric, acetic, or citric acid, or another proton generating species suitable for the particular application. Then, the fluid is caused to move relative to a second bed (i.e., the fluid flows through the second bed, or the crystals comprising the second bed move through the fluid) of zeolite crystals which are impregnated with a mixture of sodium chlorite ($NaClO_2$) and calcium chloride ($CaCl_2$). Upon moving the fluid relative to the second bed, chlorine dioxide is released (due to contact with acid or other proton generating substance transferred from the first bed). It is believed that the chlorine dioxide release occurs as a result of the following reaction, in the case of a first bed impregnated with acetic acid:

$$CH_3COOH+CaClO_2+2NaCl+H_2O \rightarrow ClO_2\uparrow+Ca(CH_3COO)_2+\text{excess protons,}$$

where $Ca(CH_3COO)_2$ is calcium acetate.

As discussed above, $CaClO_2$, $2NaCl$, and $H_2O$ are believed to be present in the channels of the zeolite crystals of the first bed as a result of reaction of the impregnating agents $NaClO_2$ and $CaCl_2$, and $H_2O$, in the channels of the zeolite crystals of the first bed.

In variations on this chlorine dioxide production method, the first bed can include a mixture of phosphoric acid-impregnated zeolite crystals and acetic acid-impregnated zeolite crystals, or a mixture of phosphoric acid-impregnated zeolite crystals and citric acid-impregnated zeolite crystals, or a mixture of acetic acid-impregnated zeolite crystals and citric acid-impregnated zeolite crystals, or a mixture of all three types of acid-impregnated zeolite crystals, or a mixture of zeolite crystals impregnated with one of these three types of acids and zeolite crystals impregnated with another acid (e.g., HCl or $H_2SO_4$).

It is preferable for the fluid to flow through a first bed of proton generating species-impregnated (e.g., acid-impregnated) zeolite crystals before the fluid flows through a second bed containing sodium chlorite and calcium chloride-impregnated zeolite crystals, since this sequence will result in protons entering the fluid (due to interaction of the fluid with the acid or other proton generating species in the crystals of the first bed), and since the presence of the hydrogen ions in the fluid will enhance chlorine dioxide production when the hydrogen ion-containing fluid interacts with the impregnating chemical in the crystals of the second bed.

While the foregoing process for producing $ClO_2$ has been described with reference to two distinct (first and second) beds of impregnated zeolite crystals, a single bed containing a mixture of crystals can be used as long as the mixed bed contains both impregnated zeolite crystals from the first bed described above and zeolite crystals from the second bed described above. As an example, a mixed bed of zeolite crystals (zeolite crystals impregnated with sodium chlorite and calcium chloride mixed with zeolite crystals impregnated with phosphoric acid) can be used to produce chlorine dioxide (e.g., by flowing a fluid through the mixed bed).

Alternatively, chlorine dioxide can be produced by adding aqueous acid to a bed of zeolite crystals impregnated with a metal chlorite (e.g., sodium chlorite) and a water-retaining substance (e.g., calcium chloride). In these alternative embodiments, the rate of release of chlorine dioxide can be controlled by varying the amount and concentration of the added acid.

In alternative embodiments, chlorine dioxide is produced with a reversed sequence of distinct first and second beds, as follows. A fluid (preferably a fluid containing oxygen such as air) is caused to move relative to a first bed (i.e., the fluid flows through the first bed, or the crystals comprising the first bed move through the fluid). The first bed comprises zeolite crystals impregnated with sodium chlorite ($NaClO_2$) and calcium chloride ($CaCl_2$). Then, the fluid is caused to move relative to a second bed (i.e., the fluid flows through the second bed, or the crystals comprising the second bed move through the fluid) of zeolite crystals which are impregnated with: (1) phosphoric acid, (2) acetic acid, (3) citric acid, (4) ferric chloride ($FeCl_3$), (5) ferric sulfate, or (6) another metal salt, such as $ZnSO_4$, $ZnCl_2$, $CoSO_4$, $CoCl_2$, $MnSO_4$, $MnCl_2$, $CuSO_4$, $CuCl_2$, or $MgSO_4$, or (7) an acid other than phosphoric, acetic, or citric acid, or another proton generating species suitable for the particular application. Upon moving the fluid relative to the second bed, chlorine dioxide is released. As with other embodiments described herein, a water-retaining, substance such as magnesium sulfate, potassium chloride, or potassium hydroxide can be substituted for the calcium chloride (and a metal chlorite other than sodium chlorite can be substituted for the sodium chlorite).

In another class of embodiments of the inventive chlorine dioxide production method, zeolite crystals impregnated with sodium chlorite and calcium chloride are activated by being immersed in (or sprayed with) aqueous acetic acid, phosphoric acid, citric acid, HCl, or sulfuric acid, with a concentration of 0.025% to 0.5% (in the sense that the acid comprises 0.025% to 0.5% by weight of the combined impregnated zeolite and acid). Alternatively, another acid or other proton generating species suitable for the particular application can be used to immerse (or spray) the impregnated zeolite crystals as a substitute for the aqueous acetic acid, phosphoric acid, citric acid, HCl, or sulfuric acid.

While chlorine dioxide can kill microorganisms in the fluid undergoing treatment, and can oxidize volatile organic chemicals which contaminate the fluid undergoing treatment (as described above), chlorine dioxide itself is a contaminant. Therefore, it is sometimes desirable to remove chlorine dioxide from the fluid stream after the chlorine dioxide has performed purification (including biological purification) of the fluid stream. Another aspect of the present invention relates to a multi-step filtration process in which chlorine dioxide is first produced in a fluid stream and, subsequently, removed from the fluid stream.

First, a fluid is caused to be moved relative to a primary bed (or primary beds) of zeolite crystals (i.e., the described first and second beds, or the described mixed bed) which will cause chlorine dioxide to be released, as described above. While the fluid moves relative to (e.g., while the fluid flows through) the primary bed or beds, chlorine dioxide is released (generally as a gas). The released chlorine dioxide will kill biological contaminants in the fluid and will oxidize volatile organic chemicals which contaminate the fluid.

Then, the fluid is moved relative to a secondary bed (filter) of zeolite crystals impregnated with one of the following: (1) potassium hydroxide (KOH), (2) sodium sulfite, (3) sodium bisulfite, and (4) ferrous sulfate (i.e., the fluid flows through the secondary bed or the crystals comprising the secondary bed move through the fluid). The zeolite crystals of the secondary bed react with the chlorine dioxide to remove the chlorine dioxide from the fluid. Some chemical equations describing possible reactions in the secondary bed follow.

For a secondary bed of potassium hydroxide:

$$2KOH+2ClO_2 \rightarrow KClO_2+KClO_4+H_2O$$

For a secondary bed of sodium sulfite:

$$ClO_2+Na_2SO_3 \rightarrow H_2O+S_2O_5+H^+{}_3ClO_3$$

Note that $H^{++}$ from the acids involved in the previous reactions cancel this reaction.

For a secondary bed of sodium bisulfite:

$$ClO_2+Na_2SO_5 \rightarrow H_2O+S_2O_5+H^+{}_3ClO_3$$

Note that $H^{++}$ from the acids involved in the previous reactions cancel this reaction.

The preferred composition of the secondary bed is ferrous sulfate. For a secondary bed of ferrous sulfate:

$$ClO_2+Fe^{++}SO_4 \rightarrow Fe^{+++}+Cl^-+ClO_2^- \rightarrow FeCl_3 \text{ (primarily).}$$

When using a secondary bed of ferrous sulfate a color change, from white to brown, takes place. This is an indicator of neutralization.

Various modifications and variations of the described methods and compositions of the invention will be apparent to those skilled in the art without departing from the scope and spirit of the invention. For example, a carrier other than zeolite crystals or water (e.g., pumice, diatomaceous earth, bentonite, or clay) can be used to carry the metal chlorite and water-retaining substance (and optionally also the acid or other proton generating species) of the invention.

We next describe other classes of embodiments of the invention.

In one such class of embodiments, the invention is a method for producing chlorine dioxide by activating a mixture comprising zeolite crystals impregnated with sulfuric acid (or other proton generating species), zeolite crystals impregnated with sodium chlorate, zeolite crystals impregnated with an oxidizer, and optionally also zeolite crystals impregnated with calcium chloride (or another deliquescent or water absorbing and retaining substance). The oxidizer is a substance (or mixture of substances) which reacts (in the presence of water absorbed by the deliquescent or water absorbing substance) to release another substance which in turn reacts with one or more of the other impregnating substances to produce chlorine dioxide. In some of these embodiments, the oxidizer is ferric chloride or ferric sulfate, or a mixture of ferric chloride and ferric sulfate. Although each of these iron salts desirably absorbs water in addition to functioning as an oxidizer, ferric chloride is preferably used (rather than ferric sulfate, or a mixture of ferric chloride and ferric sulfate) since it is the most reactive during performance of the inventive method. Where sodium chlorate, ferric chloride, and sulfuric acid are present upon activation, the chlorine dioxide-producing reaction is believed to be: $2Na(ClO_3)+FeCl_3+H_2SO_4+3H_2O \rightarrow Na_2SO_4+Fe(OH)_3+3HCl+2H_2O+2ClO_2\uparrow$. In any of this class of embodiments, the activation can be accomplished by exposing the mixture to a moisture-containing gas (e.g., air including water vapor), or (to achieve a higher chlorine dioxide production rate) causing water or a moisture-containing gas to flow through the mixture (or by causing the mixture to move through the gas). When activation is accomplished using a flowing fluid, all the impregnated zeolite crystals can be physically mixed together in a single bed, or the gas can be caused to flow sequentially through distinct beds of subsets of the zeolite crystals.

In other embodiments, chlorine dioxide is produced by activating (with excess protons) a zeolite crystal mixture comprising zeolite crystals impregnated with sodium chlorate, zeolite crystals impregnated with at least one oxidizer (e.g., hydrogen peroxide, ferric chloride, or peracetic acid), and optionally also zeolite crystals impregnated with calcium chloride. Preferably, the mixture comprises equal (or substantially equal) amounts of crystals impregnated with each of the four species. The activation can be accomplished by exposing the mixture to a moisture-containing gas (e.g., air including water vapor), or (to increase the chlorine dioxide production rate) causing water or a moisture-containing gas (e.g., air including water vapor) to flow through the mixture. When activation is accomplished using flowing fluid, all impregnated zeolite crystals can be physically mixed together in a single bed, or the fluid can be caused to flow sequentially through distinct beds of subsets of the zeolite crystals. In embodiments in which the impregnated crystal mixture comprises distinct beds of different subsets of zeolite crystals (e.g., a bed of crystals impregnated with a first substance, and another bed of crystals impregnated with a second substance mixed with crystals impregnated with a third substance), the fluid must flow sequentially through the beds to accomplish activation.

Where sodium chlorate, hydrogen peroxide, and sulfuric acid are present upon activation, the chlorine dioxide-producing reaction is believed to be $2Na(ClO_3)+H_2O_2+H_2SO_4 \rightarrow 2ClO_2\uparrow+Na_2SO_4+H_2O$.

In variations on the embodiments described in the previous paragraph, zeolite crystals impregnated with sodium metabisulfite (or sodium bisulfite) are used rather than zeolite crystals impregnated with at least one of hydrogen peroxide, ferric chloride, and peracetic acid. Activation of the mixture by absorbed water (water absorbed by the deliquescent or water absorbing and retaining substance) causes a reaction of the sodium metabisulfite (or sodium bisulfite) which releases sulfur dioxide ($SO_2$). The $SO_2$ then reacts to form chlorine dioxide gas. Each of sodium metabisulfite and sodium bisulfite is considered an "oxidizer" in the sense that the latter expression is used herein, since each reacts (in the presence of the absorbed water) to release sulfur dioxide which in turn reacts with one or more of the other impregnating substances to produce chlorine dioxide.

In other embodiments, chlorine dioxide is produced by activating a zeolite crystal mixture comprising zeolite crystals impregnated with sodium chlorate, zeolite crystals impregnated with sulfuric acid (or another proton generating species, such as ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$ or another metal salt), zeolite crystals impregnated with an oxidizer, and optionally also zeolite crystals impregnated with a deliquescent (or water absorbing and retaining substance). As in other embodiments, activation of the zeolite crystal mixture can be accomplished by exposing the mixture to a moisture-containing gas (e.g., air including water vapor), or (in order to increase the chlorine dioxide production rate) by causing water or a moisture-containing gas to flow through the mixture (or causing the mixture to move through such fluid). When activation is accomplished using flowing fluid, the impregnated zeolite crystals can be physically mixed together in a single bed or the fluid can be caused to flow sequentially through distinct beds of subsets of the zeolite crystals. In some of these embodiments, the deliquescent (or water absorbing and retaining substance) is magnesium sulfate ($MgSO_4$), potassium chloride, or magnesium chloride (MgCl).

In other embodiments, the invention is a method for producing chlorine dioxide by activating an impregnated zeolite crystal mixture with an oxidizer (such as ferric chloride solution (preferably) or liquid hydrogen peroxide or liquid peracetic acid). The zeolite crystal mixture comprises zeolite crystals impregnated with sodium chlorate, zeolite crystals impregnated with sulfuric acid (or another proton generating species), and optionally also zeolite crystals impregnated with calcium chloride (or another deliquescent or water absorbing and retaining substance).

In other embodiments, the invention is a method for producing chlorine dioxide by activating an impregnated zeolite crystal mixture with excess protons, such as by exposing it to liquid sulfuric acid (or another proton generating species). The zeolite mixture comprises zeolite crystals impregnated with sodium chlorate, zeolite crystals impregnated with an oxidizer (e.g., at least one of hydrogen peroxide, ferric chloride, and peracetic acid), and optionally also zeolite crystals impregnated with calcium chloride (or another deliquescent or water absorbing and retaining substance).

In other embodiments, the invention is a method for producing chlorine dioxide by activating an impregnated zeolite crystal mixture with sodium chlorate solution. The zeolite mixture comprises zeolite crystals impregnated with sulfuric acid (or another proton generating species), zeolite crystals impregnated with an oxidizer (e.g., at least one of hydrogen peroxide, ferric chloride, and peracetic acid), and optionally also zeolite crystals impregnated with calcium chloride (or another deliquescent or water absorbing and retaining substance).

Also within the scope of the invention are methods in which mixtures of two or more of the above-described impregnated zeolite mixtures are activated to produce chlorine dioxide. An example is a method for producing chlorine dioxide by activating a zeolite crystal mixture comprising zeolite crystals impregnated with sulfuric acid, zeolite crystals impregnated with sodium chlorate, zeolite crystals impregnated with at least one of hydrogen peroxide, ferric chloride, and peracetic acid, zeolite crystals impregnated with calcium chloride, and zeolite crystals impregnated with sodium metabisulfite (or sodium bisulfite).

Figure 3:
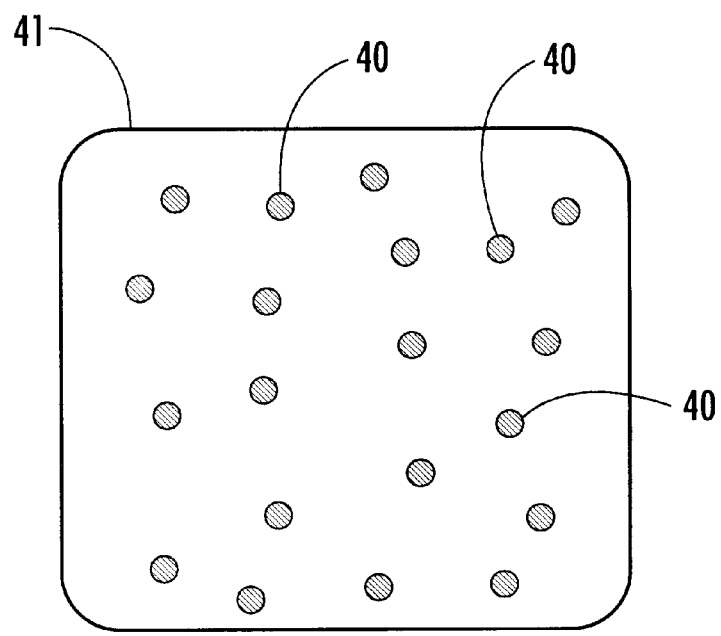
FIG. 3 is a cross-sectional view of a mixture of impregnated zeolite crystals (prepared in accordance with any embodiment of the invention) in a sealed container.

In any embodiment of the invention, the rate of chlorine dioxide release (upon activation of the zeolite crystal mixture) can be controlled in any of several ways, including by appropriately selecting the concentration and amount of an activating liquid (e.g., where the activating liquid is sodium chlorate solution or liquid sulfuric acid), using impregnated zeolite crystals having an appropriately selected weight ratio of one or more of the impregnating substances (e.g., iron salt) to zeolite, and selecting an appropriate method for activating the mixture. For example, activation by exposing the mixture to moisture-containing gas typically results in a low chlorine dioxide release rate, and activation by flowing water or moisture-containing gas through the mixture typically results in a higher chlorine dioxide release rate. Prior to activation, the mixture of impregnated crystals should be as dry as possible. Preferably, the mixture (e.g., mixture of impregnated zeolite crystals 40 of FIG. 3) is sealed within a dry, air-tight capsule or other container (e.g., container 41 of FIG. 3), and the container is unsealed to expose the mixture to the activating fluid shortly before activation.

In yet another class of embodiments, the invention is a mixture of impregnated zeolite crystals which can be activated (by any of the above-described liquids or by water or moisture-containing gas in accordance with the invention) to perform any embodiment of the inventive chlorine dioxide production method.

The chlorine dioxide produced in accordance with the invention can be used to kill microorganisms in the moisture-containing gas which activates the crystal mixture, and can oxidize volatile organic chemicals which contaminate the moisture-containing gas.

Figure 4:
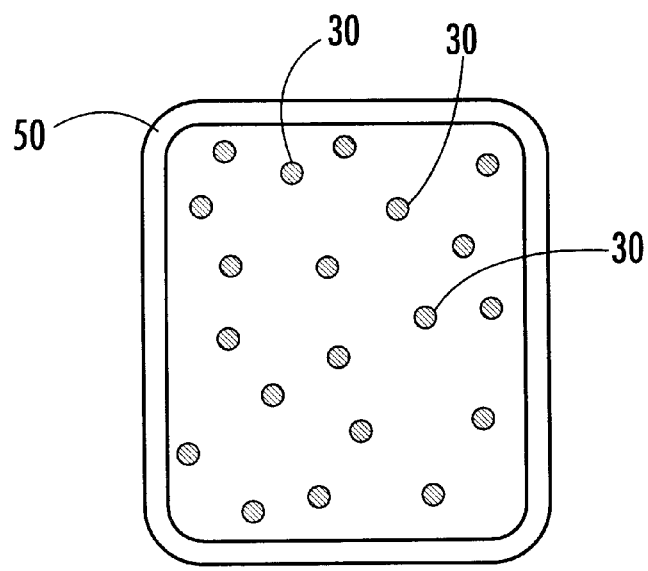
FIG. 4 is a cross-sectional view of a mixture of impregnated zeolite crystals (prepared in accordance with the invention) surrounded by a barrier permeable to chlorine dioxide gas.

In another class of embodiments, the invention is composition of matter which carries sufficient amounts of chemicals to be capable of releasing chlorine dioxide to a target region upon activation by excess protons, said composition of matter comprising a quantity of impregnated zeolite crystals including zeolite crystals impregnated with a metal chlorite and zeolite crystals impregnated with a proton generating species, wherein the quantity is capable of being activated by excess protons to produce chlorine dioxide. Zeolite crystals 30 of FIG. 4 are such a quantity of impregnated zeolite crystals. Preferably, those of crystals 30 which are impregnated with a metal chlorite are also impregnated with at least one of a deliquescent and a water absorbing and retaining substance (e.g., they are impregnated with calcium chloride) in a concentration which limits (to a predetermined maximum level) the rate of release of chlorine dioxide to the target region in response to activation of the quantity of crystals with excess protons. For example, zeolite crystals 30 can include zeolite crystals impregnated with metal chlorite, a water absorbing and retaining substance, and an acid (or other proton generating species). Such crystals will be activated by liquid water or atmospheric moisture (which will cause production of excess protons, which in turn will cause chlorine dioxide production). The relative concentrations of impregnating chemicals will control the rate at which excess protons are produced (and thus the rate at which chlorine dioxide is produced) in response to a specific amount of water.

For some applications, the quantity of crystals is separated by a barrier (e.g., barrier 50 of FIG. 4) from the target region. The barrier should be permeable to flow of an activating fluid (e.g., water) from the target region such that the activating fluid will interact with the quantity of impregnated zeolite crystals in a manner resulting in production of excess protons (which in turn results in production of chlorine dioxide). The barrier should also be permeable to flow of the chlorine dioxide to the target region. Preferably, the permeability of the barrier is such that the quantity of zeolite crystals is exposed to no more than predetermined maximum flow rate of the activating fluid (e.g., the barrier is permeable to flow of the activating fluid from the target region at up to a predetermined maximum flow rate), so that the barrier limits to a predetermined maximum level the rate of release of chlorine dioxide to the target region.

Although the invention has been described in connection with specific preferred embodiments, it should be understood that the invention as claimed should not be unduly limited to such specific embodiments.

What is claimed is:

1. A method for producing chloride dioxide, including the steps of:

(a) providing impregnated zeolite crystals which have been impregnated with a metal chlorite, wherein the impregnated zeolite crystals have also been impregnated with at least one impregnating agent selected from the group consisting of calcium chloride, magnesium sulfate, potassium chloride, and potassium hydroxide; and (b) activating the impregnated zeolite crystals with excess protons, thereby producing chlorine dioxide as a result of reaction of the protons with the impregnated zeolite crystals.

2. The method of claim 1, wherein the zeolite crystals comprise 1%–6% sodium chlorite, 0.5%–2% calcium chloride, 0%–20% water, and 72%–98.5% zeolite by weight.

3. The method of claim 1, wherein step (b) includes the step of:

exposing the impregnated zeolite crystals to excess protons, thereby producing the chlorine dioxide as a result of reaction of the protons with the impregnated zeolite crystals.

4. A method for producing chloride dioxide, including the steps of:

(a) providing impregnated zeolite crystals which have been impregnated with a metal chlorite; and (b) activating the impregnated zeolite crystals with excess protons, thereby producing chlorine dioxide as a result of reaction of the protons with the impregnated zeolite crystals;

wherein step (b) includes the step of activating a proton generating species to produce the excess protons, the proton generating species comprises a metal salt, and the step of activating said proton generating species is accomplished by exposing the metal salt to water.

5. The method of claim 4, wherein the metal salt is a member of the group consisting of ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$.

6. A method for producing chlorine dioxide, including the steps of:
(a) causing a fluid to flow through a first set of impregnated zeolite crystals, wherein the impregnated zeolite crystals have been impregnated with at least one proton generating impregnating agent; and
(b) after step (a), causing the fluid to flow through a second set of impregnated zeolite crystals, wherein the impregnated zeolite crystals in the second set have been impregnated with a metal chlorite and at least one impregnating agent selected from the group consisting of calcium chloride, magnesium sulfate, potassium chloride, and potassium hydroxide, wherein chlorine dioxide is produced as a result of reaction of the second set of impregnated zeolite crystals with excess protons released from the at least one proton generating impregnating agent.

7. The method of claim 6, wherein the metal chlorite is sodium chlorite.

8. The method of claim 6, wherein the second set of impregnated zeolite crystals consists essentially of zeolite crystals impregnated with sodium chlorite and calcium chloride.

9. The method of claim 6, wherein said at least one proton generating impregnating agent is at least one acid.

10. The method of claim 6, wherein the fluid includes water and said at least one proton generating impregnating agent includes a metal salt.

11. The method of claim 10, wherein the metal salt is a member of the group consisting of ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$.

12. A method for filtering a fluid containing a contaminant, including the steps of:
(a) moving the fluid through a first bed of impregnated zeolite crystals which have been impregnated with one of at least one proton generating impregnating agent and a metal chlorite; and
(b) after step (a), moving the fluid through a second bed of impregnated zeolite crystals which have been impregnated with another one of at least one proton generating impregnating agent and a metal chlorite, wherein chloride dioxide is produced as a result of the chemical reaction of said at least one proton generating impregnating agent;
wherein the fluid includes water and said at least one proton generating impregnating agent includes a metal salt.

13. The method of claim 12, wherein the metal salt is a member of the group consisting of ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$.

14. A method for filtering a fluid containing a contaminant, including the steps of:
(a) moving the fluid through a first bed of impregnated zeolite crystals which have been impregnated with one of at least one proton generating impregnating agent and a metal chlorite; and
(b) after step (a), moving the fluid through a second bed of impregnated zeolite crystals which have been impregnated with another one of at least one proton generating impregnating agent and a metal chlorite, wherein chloride dioxide is produced as a result of the chemical reaction of said at least one proton generating impregnating agent;
wherein the first bed of impregnated zeolite crystals have been impregnated with said at least one proton generating impregnating agent and the second bed of impregnated zeolite crystals have been impregnated with said metal chlorite and at least one impregnating agent selected from the group consisting of calcium chloride, magnesium sulfate, potassium chloride, and potassium hydroxide, and wherein the chlorine dioxide is produced as a result of chemical reaction of at least a portion of the second bed with at least one of said at least one proton generating impregnating agent and protons resulting from activation of said at least one proton generating impregnating agent.

15. The method of claim 14, wherein the metal chlorite is sodium chlorite.

16. The method of claim 15, wherein the second bed consists essentially of zeolite crystals impregnated with sodium chlorite and calcium chloride.

17. The method of claim 14, wherein the second bed consists essentially of impregnated zeolite crystals comprising 1%–6% sodium chlorite, 0.5%–2% calcium chloride, 0%–20% water, and 72%–98.5% zeolite by weight.

18. A method for filtering a fluid containing a contaminant, including the steps of:
(a) moving the fluid through a first bed of impregnated zeolite crystals which have been impregnated with one of at least one proton generating impregnating agent and a metal chlorite; and
(b) after step (a), moving the fluid through a second bed of impregnated zeolite crystals which have been impregnated with another one of at least one proton generating impregnating agent and a metal chlorite, wherein chloride dioxide is produced as a result of the chemical reaction of said at least one proton generating impregnating agent;
wherein the first bed of impregnated zeolite crystals have been impregnated with said metal chlorite and at least one proton generating impregnating agent selected from the group consisting of calcium chloride, magnesium sulfate, potassium chloride, and potassium hydroxide, and the second bed of impregnated zeolite crystals have been impregnated with said at least one proton generating impregnating agent, and wherein the chlorine dioxide is produced as a result of chemical reaction of at least one substance released from the first bed with at least one of said at least one proton generating impregnating agent and protons resulting from activation of said at least one proton generating impregnating agent.

19. The method of claim 18, wherein the metal chlorite is sodium chlorite.

20. The method of claim 19, wherein the first bed consists essentially of zeolite crystals impregnated with sodium chlorite and calcium chloride.

21. The method of claim 19, wherein the first bed consists essentially of impregnated zeolite crystals comprising 1%–6% sodium chlorite, 0.5%–2% calcium chloride, 0%–20% water, and 72%–98.5% zeolite by weight.

22. A method for filtering a fluid containing a contaminant, including the step of:
(a) moving the fluid through a bed of impregnated zeolite crystals comprising a mixture of first zeolite crystals and second zeolite crystals, wherein the first zeolite crystals have been impregnated with at least one proton generating impregnating agent, and the second zeolite crystals have been impregnated with a metal chlorite and at least one impregnating agent selected from the group consisting of calcium chloride, magnesium sulfate, potassium chloride, and potassium hydroxide, whereby chlorine dioxide is produced as a result of reaction of the second zeolite crystals with excess protons released from the at least one proton generating impregnating agent.

23. The method of claim 22, wherein the metal chlorite is sodium chlorite.

24. The method of claim 23, wherein the second zeolite crystals consist essentially of zeolite crystals impregnated with sodium chlorite and calcium chloride.

25. The method of claim 22, wherein the second zeolite crystals consist essentially of impregnated zeolite crystals comprising 1%–6% sodium chlorite, 0.5%–2% calcium chloride, 0%–20% water, and 72%–98.5% zeolite by weight.

26. The method of claim 22, wherein the fluid is air.

27. The method of claim 22, also including the step of:
(b) after step (a), moving the fluid relative to a second bed of impregnated zeolite crystals, wherein the impregnated zeolite crystals in the second bed have been impregnated with an impregnating agent selected from the group consisting of potassium hydroxide, sodium sulfite, sodium bisulfite, and ferrous sulfate, so that at least some of the chlorine dioxide is removed by chemical reaction with the second bed.

28. The method of claim 22, wherein said at least one proton generating impregnating agent is at least one acid.

29. The method of claim 22, wherein the fluid includes water and said at least one proton generating impregnating agent includes a metal salt.

30. The method of claim 29, wherein the metal salt is a member of the group consisting of ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$.

31. A composition of matter, carrying sufficient amounts of chemicals to be capable of releasing chlorine dioxide to a target region upon activation by excess protons, said composition of matter comprising:

a quantity of impregnated zeolite crystals, wherein said quantity comprises zeolite crystals impregnated with a metal chlorite and zeolite crystals impregnated with a proton generating species, and wherein said quantity is capable of being activated by excess protons to produce chlorine dioxide; and a barrier separating the quantity of impregnated zeolite crystals from the target region, wherein the barrier is permeable to flow of an activating fluid from the target region such that the activating fluid will interact with the quantity of impregnated zeolite crystals in a manner resulting in production of said excess protons and production of said chlorine dioxide, wherein the barrier is also permeable to flow of the chlorine dioxide to the target region.

32. A composition of matter of claim 31, wherein the barrier is permeable to flow of the activating fluid from the target region at up to a predetermined maximum flow rate, so that the barrier limits to a predetermined maximum level the rate of release of the chloride dioxide to the target region.

33. A composition of matter, carrying sufficient amounts of chemicals to be capable of releasing chlorine dioxide to a target region upon activation by excess protons, said composition of matter comprising:

a quantity of impregnated zeolite crystals, wherein said quantity comprises zeolite crystals impregnated with a metal chlorite and zeolite crystals impregnated with a proton generating species, and wherein said quantity is capable of being activated by excess protons to produce chlorine dioxide, and wherein the quantity of impregnated zeolite crystals also comprises:

zeolite crystals impregnated with at least one of a deliquescent and a water absorbing and retaining substance in a concentration which limits to a predetermined maximum level the rate of release of the chlorine dioxide to the target region.

34. A composition of matter of claim 33, wherein said zeolite crystals impregnated with at least one of a deliquescent and a water absorbing and retaining substance are zeolite crystals impreganted with calcium chloride.

* * * * *